Figure 1:
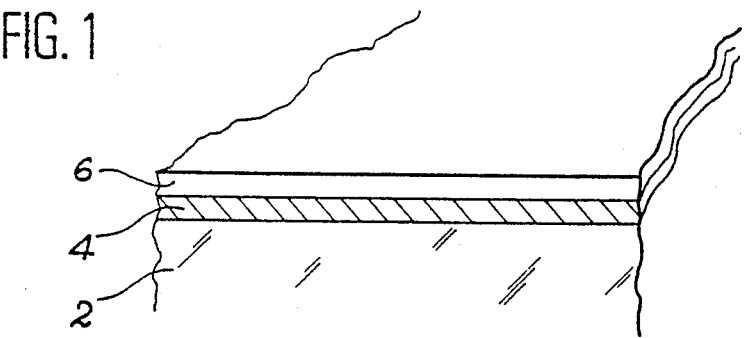

United States Patent [19]

Sibuet

[11] Patent Number: 4,944,831
[45] Date of Patent: Jul. 31, 1990

[54] PROCESS FOR OBTAINING A PATTERN, IN FERROMAGNETIC MATERIAL HAVING DIFFERENTLY SLOPING SIDES

[75] Inventor: Henri Sibuet, Saint Egreve, France

[73] Assignee: Commissariat a l'Energie Atomique, Paris, France

[21] Appl. No.: 228,448

[22] Filed: Aug. 5, 1988

[30] Foreign Application Priority Data

Aug. 14, 1987 [FR] France ............................... 87 11599

[51] Int. Cl.⁵ ..................... B44C 1/22; B29C 37/00; C23F 1/02; C03C 15/00
[52] U.S. Cl. .................................. 156/643; 156/646; 156/651; 156/653; 156/656; 156/657; 156/659.1; 156/661.1; 156/668; 29/603; 204/192.36; 204/192.37; 360/125; 427/130; 427/132
[58] Field of Search ............... 156/643, 644, 646, 651, 156/653, 656, 657, 659.1, 661.1, 664, 668; 427/38, 39, 130, 131, 132; 360/125; 204/192.2, 192.34, 192.36, 192.37; 29/603, 604, 607

[56] References Cited

U.S. PATENT DOCUMENTS

| | | | |
|---|---|---|---|
| 4,326,936 | 4/1982 | Jones | 156/643 X |
| 4,443,294 | 4/1984 | Suenaga et al. | 156/656 |
| 4,791,719 | 12/1988 | Kobayashi et al. | 156/656 X |

FOREIGN PATENT DOCUMENTS 2380636 9/1978 France .

OTHER PUBLICATIONS

Patent Abstracts of Japan, vol. 10, No. 3, (P.418)(2060).
Patent Abstracts of Japan, vol. 2, No. 115, 25 Sep. 1978.

Primary Examiner—William A. Powell
Attorney, Agent, or Firm—Oblon, Spivak, McClelland, Maier & Neustadt

[57] ABSTRACT

Process for obtaining a pattern, particularly of ferromagnetic material, having differently sloping sides and magnetic head having such a pattern.

This process consists of depositing on a ferromagnetic layer (4) resting on a ceramic support (2), a photosensitive resin layer (6), forming by photolithography an opening (8) in said resin layer and then polymerizing said resin in order that the sides (8a) of the opening are inclined, forming a two-layer mask (10a, 12a) on the resin layer partly masking said opening and defining the shape of the pattern to be produced in the ferromagnetic layer, anisotropically etching the resin layer in order to eliminate the unmasked regions of said layer, eliminating the mask, anisotropically eteching the ferromagnetic layer (4) using the etched resin layer as the etching mask (6a) and eliminating the remainder of the resin layer.

8 Claims, 3 Drawing Sheets

PROCESS FOR OBTAINING A PATTERN, IN FERROMAGNETIC MATERIAL HAVING DIFFERENTLY SLOPING SIDES

DESCRIPTION

The present invention relates to a process for obtaining a pattern having differently sloping sides usable more particularly in microelectronics, wherever it is necessary to obtain an inclined step passage, facilitating the deposition and continuity of the subsequently deposited layers. More specifically, the invention applies to producing the pole pieces of read - write magnetic heads produced in integrated technology on an insulating substrate.

In known manner, a read - write magnetic head produced in integrated technology has a pole piece resting on an insulating support and having, in the head gap area, a projection used for the magnetization of the magnetic support (disk, strip) on which will be recorded the information to be kept. Electric conductors make it possible to carry the electric currents responsible for producing magnetizing fields in the head gap. These conductors are all in the form of conductive strips surmounting the pole piece.

In order to magnetize a clearly defined zone of the magnetic support, in order to facilitate the reading of information stored thereon and to permit the storage of a large number of informations on said support, the projection of the pole piece must have a constant, precise width, as well as vertical flanks or sides. This is generally obtained by directive etching of a ferromagnetic layer through an etching mask of identical shape to that which it is wished to obtain for the pole piece.

Bearing in mind the relatively large thickness of the ferromagnetic layer, directive etching leads to the formation of a step, whose clearance by the material layers surmounting the pole piece presents a certain number of problems.

In particular, this step passage leads to a contraction of the electrical conductors used for producing the magnetizing field in the head gap, increases their electrical resistance and thus decreases the performance characteristics of the magnetic head. Moreover, in certain cases, said step passage can lead to a breaking of the conductors, thus preventing any operation of the read - write magnetic head.

In order to smooth the step passage, consideration has been given to covering the rear part of the pole piece opposite to the magnetization projection, with flattening or "planarization" layers, which are generally made from polymers. However, unfortunately these planarization layers have a limited thermal stability, so that the performance characteristics of the magnetic heads are reduced.

Moreover, the realization of these polymer layers is relatively complex and not very reproducible, which is particularly prejudicial for the mass production of magnetic heads in integrated technology.

Finally, the increase in the number of materials used in the construction of the magnetic heads is prejudicial to their integrity by reducing the magnetic performances thereof.

The present invention relates to a process for obtaining a pattern, particularly in ferromagnetic material, having sides of different slopes, which makes it possible to obviate the disadvantages referred to hereinbefore. This process more particularly makes it possible to produce pole pieces having a smooth step passage without requiring the presence of planarization materials.

The principle of the inventive process is based on producing a mask representing the image of the pattern to be produced and having a variable slope profile identical to that which it is wished to obtain, the transfer of the shape and the profile of the mask into the desired layer, in particular of ferromagnetic material, by directive etching of the corresponding layer.

This process makes it possible to ensure that the etching mask shapes are perfectly respected in the underlying layer by vertical etching in the regions requiring it, as well as the obtaining in said same underlying layer of an inclined side facilitating the step passage for the subsequently deposited layers.

More specifically, the invention relates to a process for obtaining a pattern in a first material having differently sloping sides, characterized in that it comprises the following stages:

(a) deposition on a layer of first material of a first photosensitive resin layer, (b) formation of an opening with inclined sides in the first resin layer, (c) producing a mask on the first resin layer, partly masking said opening, defining the shape of the pattern to be produced and having an inclined side facing said opening, (d) anisotropic etching of the first resin layer in order to eliminate the regions of said first layer which are not masked, (e) elimination of the mask, (f) anisotropic etching of the layer of the first material using the first etched resin layer as the etching mask, and (g) elimination of the remainder of the first resin layer.

Anisotropic etching is understood to mean a unidirectional etching of the ionic type, or reactive ionic etching performed in a direction perpendicular to the surface of the sample.

The process according to the invention makes it possible to obtain an etching mask for the first material layer having both abrupt sides and inclined sides. Such a configuration could not be obtained by directly forming by photolithography the image of the pattern to be produced in the first resin layer, i.e. without using an intermediate etching mask (stage c).

This process is relatively simple and involves no critical stage, which is unlike the prior art process.

The opening with inclined sides in the first photosensitive resin layer can be produced by photolithography followed by polymerization annealing of the resin. The photosensitive resin used can be a positive or negative and optionally polymerizable resin, such as that conventionally used in microelectronics. Advantageously the first resin layer is constituted by a positive photosensitive layer polymerizable by heating. In this case, the opening with inclined flanks in said layer is advantageously obtained by forming by photolithography an opening in said resin layer having vertical sides, followed by a polymerization of the resin by heating in order to obtain inclined sides. In order to obtain gently sloping inclined sides, the first resin layer has a relatively large thickness exceeding 2 μm.

To permit the production of a resin mask having clearly defined, planar sides (without undulations) in the first thick resin layer, it is advantageous to use the three-layer masking method. To this end, stage (c) of the inventive process advantageously comprises:

depositing a second material layer on the structure obtained during stage (b), which can be selectively etched with respect to the first material and with respect to the resin, depositing a second photosensitive resin layer on the entire second material layer, defining the shape of the pattern to be produced in the second resin layer by photolithography, anisotropically etching the second material layer in order to eliminate the second material regions not covered with resin and to expose the underlying regions of the first resin layer.

The process according to the invention is suitable for producing a pattern with a variable slope profile in a ferromagnetic layer, particularly based on iron and nickel. However, other ferromagnetic materials can be used, such as e.g. the alloy of iron, silicon and aluminium known as SENDUST.

According to the invention the second material must differ from the first material in which is produced the pattern with the variable slope profile, i.e. these two materials must be etchable independently of one another. In the same way, the first and second materials must be selectively etchable with respect to the resin of the first and second resin layers, whereby the latter can be the same or different.

In the special case of a first material based on iron and nickel and photosensitive resins generally used in photolithography, the second material can be silicon dioxide, silicon, silicon nitride, etc.

The inventive process is advantageously applied to the production of a pole piece of a read - write magnetic head on an insulating substrate, said pole piece having differently sloping sides. This substrate must have good mechanical and thermal properties and is in particular made from a ceramic material.

The invention also relates to a read - write magnetic head obtained by the inventive process. This magnetic head is characterized in that the pole piece has in a first region a projection with abrupt sides perpendicular to the surface of the support and in a second region, opposite to the first region, a side inclined with respect to said surface. This magnetic head has improved magnetic performances compared with those of the prior art.

Other features and advantages of the invention can be better gathered from the following description given in a non-limitative, illustrative manner with reference to FIGS. 1 to 7, which in perspective and diagrammatically show the different stages of the inventive process.

As this process is particularly suitable for producing the pole piece of a read - write magnetic head in integrated technology, the following description will relate to the production of such a pole piece.

The first stage of the process and as shown in FIG. 1 comprises depositing on a ceramic substrate 2, e.g. of alumina charged or not charged with titanium carbide, an iron - nickel (or Permalloy) ferromagnetic layer 4 with a thickness of 2 μm by cathodic sputtering. This is followed by the deposition of an approximately 3 μm thick positive photosensitive resin layer 6. This resin is in particular one of those marketed by the SHIPPLEY Company under the name Microposit 1375.

Figure 2:
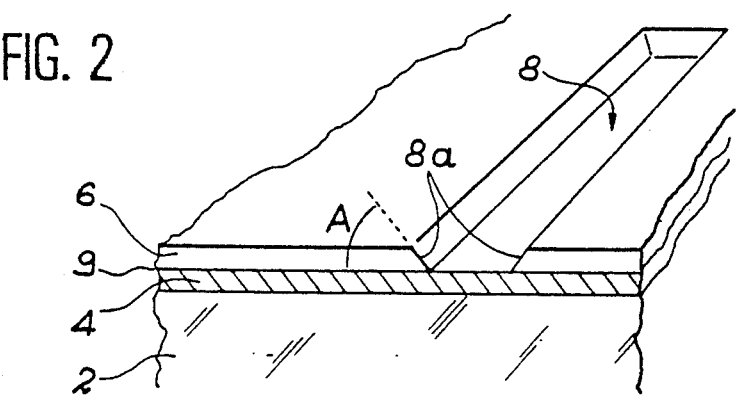

An opening 8, like that shown in FIG. 2, is then formed in the resin layer 6 by photolithography, i.e. by irradiating the resin through a photomask representing the image of the opening 8 to be made and defining the dimensions of the latter, followed by the development of the irradiated resin in a developer, like that marketed by SHIPPLEY.

In order to obtain inclined sides 8a for opening 8, the resin layer 6 undergoes a heat treatment leading to its polymerization and to a flow of the latter. For Microposit 1375 resin, this heat treatment is performed for three hours at 200° C. The inclination angle A with respect to the surface 9 of ferromagnetic layer 4 is close to 45°.

Figure 3:
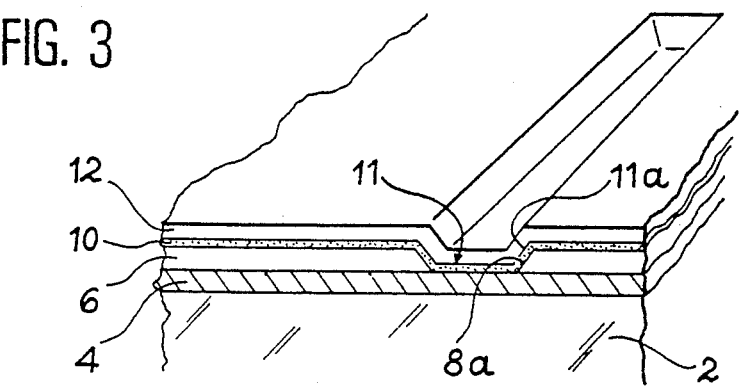

As shown in FIG. 3, this is followed by the deposition of a thin film 10 of a material which can be etched independently of ferromagnetic layer 4 and resin layer 6. Film 10 is in particular a 0.1 μm thick silicon dioxide ($SiO_2$) film deposited isotropically and in particular by plasma-assisted vapourphase chemical deposition.

This thin isotropic deposit adapts perfectly to the profile of the underlying layer 6. It in particular has a cavity or hollow 11 with inclined sides 11a identical to those 8a of opening 8 of resin layer 6.

This is followed by the deposition of a second and in particular positive photosensitive resin layer 12, like that conventionally used in photolithography (e.g. Shippley Microposit 1350H), said layer having a thickness of approximately 1.7 μm.

Figure 4:
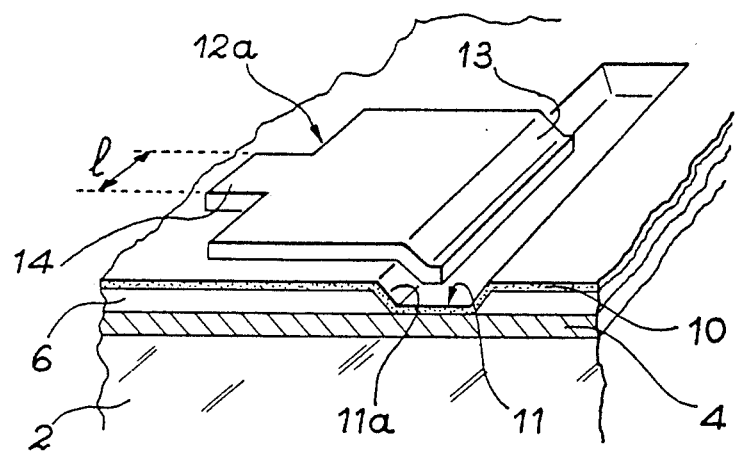

By photolithography (irradiation through an appropriately shaped photomask followed by development) in said resin layer is produced a mask 12a like that diagrammatically shown in FIG. 4 and which defines the shape of the pattern to be produced in layer 4, i.e. a mask fixing the shape of that which it is desired to obtain for the pole piece of the read - write magnetic head.

In particular, mask 12a has a projection 14 of width l, which will be subsequently used for producing, in the head gap zone of the magnetic head the magnetizing projection. Moreover, mask 12a partly masks the cavity 11 of the silicon dioxide layer 10 and is perfectly adapted to the sides 11a of said cavity, so that it has an inclined side 13.

The following stage of the process consists of subjecting film 10 to reactive ionic anisotropic etching using a $CHF_3$ plasma in order to eliminate the regions of said film 10 not covered by the resin of mask 12a. This gives an etching mask 12a for resin layer 6, whose shape fixes that of the pole piece to be produced.

Figure 5:
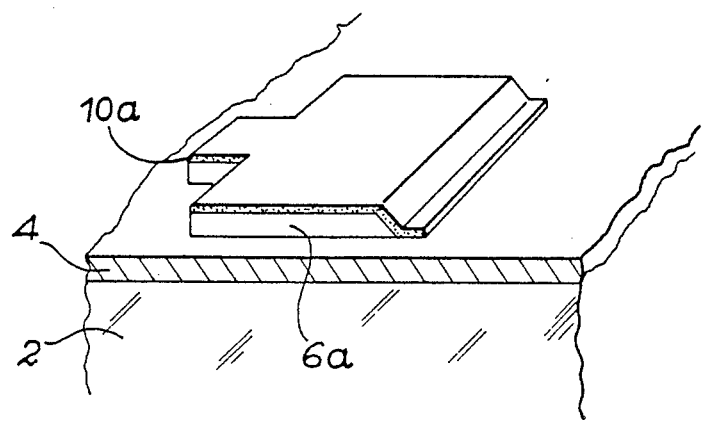
Figure 6:
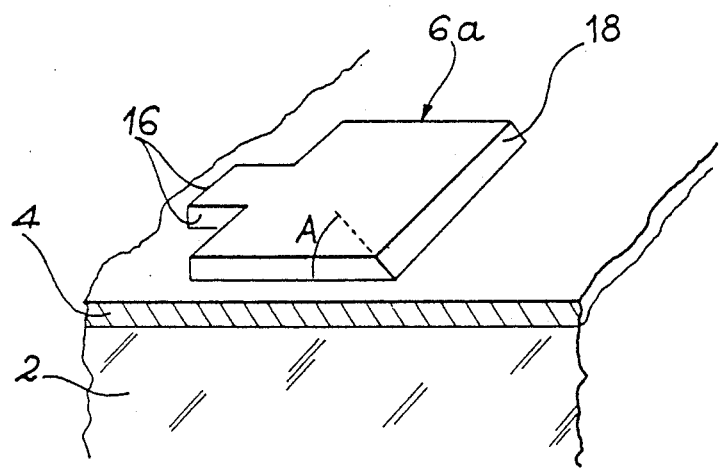

The regions of the resin layer exposed during the preceding etching of film 10, then undergo reactive ionic anisotropic etching with a view to eliminating said exposed regions and only to retain resin facing mask 12a. The structure obtained is shown in FIG. 5.

This anisotropic etching of resin layer 6 is carried out with an oxygen plasma under a pressure of approximately 1.3 Pa (10 mTorr). It also makes it possible to eliminate resin mask 12a.

The following stage of the process consists of eliminating the remainder 10a of the oxide film 10, either by plasma etching using a $CHF_3$ plasma, or by chemical etching e.g. using a mixture of $HF/NH_4F$. The structure obtained is that shown in FIG. 6.

The thus obtained resin mask 6a represents the image of the pattern to be produced. In other words, it has the shape and dimensions identical to those which it is wished to obtain in the underlying ferromagnetic layer 4. In particular, mask 6a has vertical slopes 16, in the region which is to be located in the head gap zone of the magnetic head, and a side 18 inclined by angle A with respect to the surface of the sample, on the side opposite to the vertical sides 16.

Figure 7:
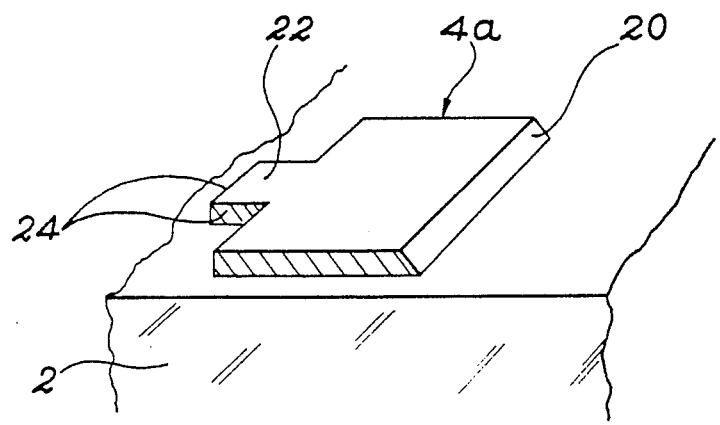

This is followed by anisotropic or unidirectional etching with the aid of an argon plasma or ionic working of the ferromagnetic layer 4, in order to transfer the shape of resin mask 6a to the ferromagnetic layer 4. The structure obtained is shown in FIG. 7.

This transfer more particularly makes it possible to obtain the pole piece 4a of a read - write magnetic head having a side 20 inclined with respect to the surface of the support 2 in its rear part and a magnetizing projection 22 in the head gap region or the front region of the pole piece having abrupt, vertical sides 24. The inclined side 20 will facilitate the step passage of the conductor wires used for producing the magnetizing field and subsequently produced.

The final stage of the process consists of eliminating the remainder of mask 6a either with the aid of an oxygen plasma, or with the aid of chemical etching using an organic solvent.

Then, in accordance with known processes, (deposition, etching, etc.) on the pole piece 4a are formed the electrical conductors for producing the magnetizing field in the magnetic head gap.

The description given hereinbefore has clearly only been provided in an illustrative manner and any modification without passing beyond the scope of the invention can be envisaged. In particular, the nature and thickness of the different layers can be modified as a function of the application intended for the inventive process.

I claim:

1. Process for obtaining a pattern (4a) in a first material having differently sloping sides (20, 24), characterized in that it comprises the following stages:
    (a) deposition on a layer of first material (4) of a first photosensitive resin (6) layer,
    (b) formation of an opening (8) with inclined sides (8a) in the first resin layer (6),
    (c) producing a mask (10a, 12a) on the first resin layer (6), partly masking said opening (8), defining the shape or the pattern to be produced and having an inclined side (11a, 13) facing said opening,
    (d) anisotropic etching of the first resin layer (6) in order to eliminate the regions of said first layer which are not masked,
    (e) elimination of the mask (12a),
    (f) anisotropic etching of the layer of the first material (4a) using the first etched resin layer as the etching mask (6a), and
    (g) elimination of the remainder of the first resin layer (6).

2. Process according to claim 1, characterized in that a first positive photosensitive resin layer (6) polymerizable by heating is used.

3. Process according to claim 2, characterized in that stage b) comprises forming an opening (8) by photolithography in the first resin layer and annealing the resin in order to obtain inclined sides (8a) of said opening.

4. Process according to claim 1, characterized in that stage (c) comprises:
    depositing a second material layer (10) on the structure obtained during stage (b), which can be selectively etched with respect to the first material and with respect to the resin,
    depositing a second photosensitive resin layer (12) on the entire second material layer (10),
    defining the shape (12a) of the pattern (4a) to be produced in the second resin layer by photolithography,
    anisotropically etching the second material layer (10) in order to eliminate the second material regions not covered with resin (12a) and to expose the underlying regions of the first resin layer (6).

5. Process according to claim 1, characterized in that the first material layer (4) is a ferromagnetic layer.

6. Process according to claim 1, characterized in that the first material layer (4) is a layer based on iron and nickel.

7. Process according to claim 1, characterized in that the second material is silicon dioxide.

8. Process according to claim 1, wherein said pattern is of a pole piece of a read - write magnetic head on an insulating substrate.

* * * * *